(12) United States Patent
Tsai et al.

(10) Patent No.: US 6,290,620 B1
(45) Date of Patent: Sep. 18, 2001

(54) CONTINUOUSLY VARIABLE TRANSMISSION WITH CONTROL ARRANGEMENT AND METHOD FOR REDUCING IMPACT OF SHOCK LOAD

(75) Inventors: Shan-Chin Tsai; Johannes Wilhelm Picard; Douglas Jerome Turner, all of Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 09/344,809

(22) Filed: Jun. 25, 1999

(51) Int. Cl.$^7$ .................................................. F16H 59/00
(52) U.S. Cl. ................. 474/18; 474/12; 474/28; 364/424.012
(58) Field of Search .................. 474/11, 12, 17, 474/18, 28; 364/424.012

(56) References Cited

U.S. PATENT DOCUMENTS

| | | |
|---|---|---|
| 3,420,344 | 1/1969 | Hilpert et al. . |
| 4,152,947 | 5/1979 | van Deursen et al. . |
| 4,458,318 * | 7/1984 | Smit et al. ............................ 474/12 |
| 4,462,275 | 7/1984 | Mohl et al. . |
| 4,500,301 | 2/1985 | Cadeé . |
| 4,585,427 | 4/1986 | Lamarche . |
| 4,685,357 | 8/1987 | Sawada et al. . |
| 4,702,725 | 10/1987 | Kouno et al. . |
| 4,729,264 | 3/1988 | Sakai . |
| 4,730,522 | 3/1988 | Morimoto . |
| 4,734,082 | 3/1988 | Tezuka . |
| 4,751,857 | 6/1988 | Sakai . |
| 4,771,658 | 9/1988 | Miyawaki . |
| 4,774,855 | 10/1988 | Murrell et al. . |
| 4,785,849 | 11/1988 | Masuda . |
| 4,793,454 | 12/1988 | Petzold et al. . |
| 4,798,561 | 1/1989 | Hattori et al. . |
| 4,969,646 | 11/1990 | Haka . |
| 4,982,822 | 1/1991 | Petzold et al. . |
| 5,007,512 | 4/1991 | Petzold . |
| 5,010,989 | 4/1991 | Huntley . |
| 5,012,697 | 5/1991 | Yamashita . |
| 5,024,310 | 6/1991 | Murano et al. . |
| 5,049,112 | 9/1991 | Gunsing . |
| 5,054,599 | 10/1991 | Marcott . |
| 5,062,049 | 10/1991 | Taylor . |
| 5,062,050 | 10/1991 | Petzold et al. . |
| 5,279,523 | 1/1994 | Schönnenbeck . |
| 5,649,876 | 7/1997 | Morishita . |
| 5,725,447 | 3/1998 | Friedmann et al. . |

* cited by examiner

Primary Examiner—David Fenstermacher
(74) Attorney, Agent, or Firm—Stephen G. Mican

(57) ABSTRACT

A continuously variable transmission and method for preventing transmission belt slippage in the case of a sudden change in load torque on the transmission involve one or both of inserting a lag in the transmission with a torsional spring damper or elastomer damper device between the device to be driven and an output shaft of the secondary pulley of the transmission, and inserting a lag in a hydraulic pressure control loop of the transmission compensating for a difference between the rate of torque transmission between the device to be driven and the transmission, and a response rate of the hydraulic pressure control loop to a sudden change in load torque. The transmission is used to drive an aircraft electrical generator at a constant speed in the disclosed embodiment.

20 Claims, 8 Drawing Sheets

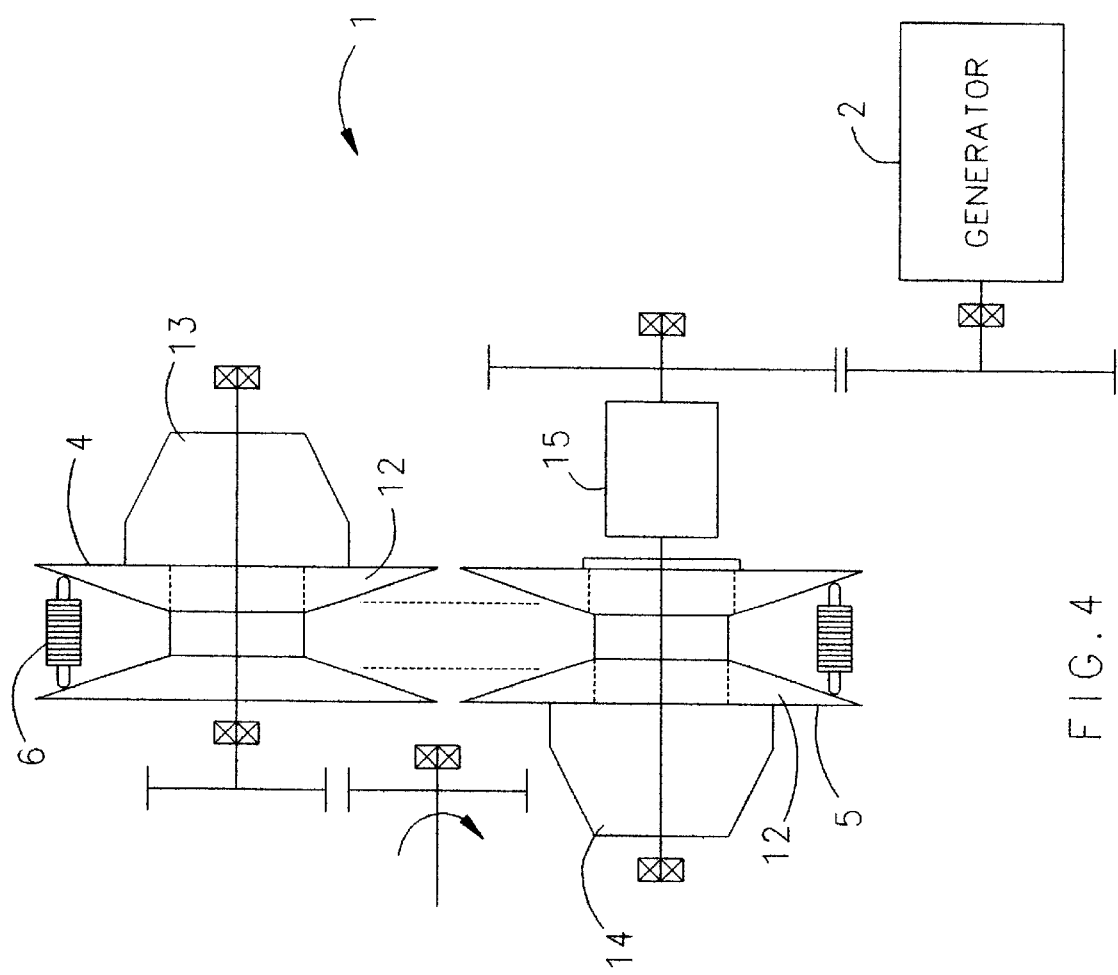

CONTINUOUSLY VARIABLE TRANSMISSION WITH CONTROL ARRANGEMENT AND METHOD FOR REDUCING IMPACT OF SHOCK LOAD

FIELD OF THE INVENTION

The present invention is directed to a continuously variable transmission and, more particularly, to a control arrangement thereof and a method for reducing impact of shock load, particularly preventing belt slippage in the transmission. In a disclosed preferred embodiment, the transmission is used as a constant speed drive for an aircraft electrical power generator.

BACKGROUND AND SUMMARY OF THE INVENTION

The variable pulley transmission, or continuously variable transmission (CVT) as it is commonly called, has been under development for over two decades. Its use has evolved from industrial and marine applications to automotive applications, not in aircraft electrical systems. Its control is rather complicated and is very sensitive to operating conditions. For example, in a control arrangement for a variable pulley transmission disclosed in U.S. Pat. No. 4,458,318, a variable line pressure is controlled and applied to the sheave of the secondary or driven pulley of the transmission, and also serves as the hydraulic power supply to a ratio control valve in a speed control loop of the transmission.

It has been found that due to the variable supply pressure in the continuously variable transmission of U.S. Pat. No. 4,458,318, both the pressure control valve (a pressure relief type valve) and the ratio control valve gains change with the supply pressure, and the control is therefore very sensitive to system operating conditions. There is a need for an improved continuously variable transmission with a control arrangement and method which overcome these drawbacks and disadvantages of this known continuously variable transmission. More particularly, there is a need for an improved continuously variable transmission with a control arrangement and method which are simpler and more robust than those disclosed in U.S. Pat. No. 4,458,318.

It is an object of the present invention to provide a continuously variable transmission with a control arrangement and method which meet this need. The commonly owned U.S. patent application Ser. No. 09/222,958 for CONTINUOUSLY VARIABLE TRANSMISSION WITH CONTROL ARRANGEMENT AND METHOD FOR REDUCING TRANSMISSION BELT SLIPPAGE, and U.S. patent application Ser. No. 09/222,948 for CONTINUOUSLY VARIABLE TRANSMISSION WITH CONTROL ARRANGEMENT AND METHOD FOR PREVENTING TRANSMISSION BELT SLIPPAGE, both filed Dec. 30, 1998, and hereby incorporated by reference, also address this need.

One of the main problems in the application for a continuously variable transmission as a constant speed drive for electrical power generation is the prevention of the belt or chain from slipping following the application and removal of a large shock load. There are two approaches for solving this problem: one is to increase the belt or chain clamping force and the other to limit the load torque transmitted to the pulley using a clutch, as disclosed in the aforementioned copending U.S. patent application Ser. No. 09/222,948, for CONTINUOUSLY VARIABLE TRANSMISSION WITH CONTROL ARRANGEMENT AND METHOD FOR PREVENTING TRANSMISSION BELT SLIPPAGE. Both of these methods require complicated hardware design. The present invention discloses and relates to a continuously variable transmission and method for reducing impact of shock load, e.g., for "softening" the load impact on the CVT pulley to give sufficient time for the control to react to the load to prevent belt slippage. The invention covers transmissions with controls using both the "push-belt" like belts, as well as for "pull-belt" style chains. Thus, the term "belt" as used herein is intended to encompass both these types of drive transmitting devices for continuously variable transmissions.

A continuously variable transmission according to the invention for transferring drive from an engine to a device to be driven, particularly an electric generator to be driven at constant speed, comprises a primary pulley for receiving drive from an engine, a belt, and a secondary pulley which is coupled via the belt to the primary pulley for transferring drive to the device to be driven. The primary and secondary pulleys each have an axially movable sheave and a hydraulically operated actuator therefor to effect ratio change of the transmission and to maintain belt tension. A single source of constant hydraulic pressure is operatively connected for driving each of the actuators. A torsional spring damper device or elastomer damper device is provided between the device to be driven and an output shaft of the secondary pulley of the continuously variable transmission for introducing a time lag in the transmission of torque between the device to be driven and the output shaft of the secondary pulley of the transmission in response to a sudden load change. This transmission is particularly advantageous in that the torsional spring damper device or elastomer damper device can be used to replace the relatively more complicated and bulky controllable clutch. The time lag gives sufficient time for the control system to respond to the sudden load change.

In the ideal case, the rate of torque transmission should match the response of the control system. To compensate for the difference between the two due to design and/or operating temperature change, according to a second feature of the invention, the hydraulic pressure control loop of the transmission can include a lag element for compensating for a difference between a rate of torque transmission between the device to be driven and the transmission, and a response rate of the hydraulic pressure control loop to sudden changes in load of the device to be driven on the transmission. The lag element preferably has a time constant which changes with temperature of the hydraulic fluid of the hydraulic pressure control loop to compensate for a variation of hydraulic fluid viscosity. This second feature of the invention can be used in combination with the aforementioned feature, or independently thereof.

The continuously variable transmission of the present invention comprises a further feature wherein a ratio control valve operatively connects a source of hydraulic pressure to one of either of the actuator of the primary pulley or the actuator of the secondary pulley, depending on operating conditions, to effect the ratio change of the transmission while the ratio control valve operatively connects the other of the actuators of the primary and secondary pulleys to a return. A pressure control valve of the transmission operatively connects the source of hydraulic pressure to the ratio control valve for controlling the return pressure of the ratio control valve to maintain the belt tension. This control arrangement of the transmission, therefore, includes two interactive control loops: a pressure control loop to provide enough belt clamping force for the primary and secondary sheaves to prevent the belt from slipping, and a speed control loop to change the CVT transmission ratio in order to maintain a constant rotational speed of the generator during engine speed and load variations.

A method for controlling a continuously variable transmission according to the invention comprises setting the hydraulic pressure to be applied by the hydraulic pressure control loop to keep the belt from slipping. This step of setting the hydraulic pressure to be applied includes determining the load torque transmitted from the device to be driven by the secondary pulley of the transmission and the speed ratio of the transmission, calculating a value $P_{set}$ for the set pressure of the hydraulic pressure control loop utilizing the determined load torque, and multiplying the calculated value for the set pressure $P_{set}$ by a margin factor slightly greater than 1, such as 1.2, to prevent belt slippage, while guarding against the use of too large a pressure which would shorten the life of the belt and the pulleys. During the transient period of a sudden increase of the load torque on the transmission, a greater factor is utilized for determining the set pressure than during the period the load torque is at a steady state value, whereby belt slippage does not occur.

These and other objects, features and advantages of the present invention become more apparent when taken in conjunction with the following detailed description of a preferred embodiment in accordance with the invention and the accompanying drawings.

BRIEF DESCRIPTION OF THE DRAWINGS

FIG. 3b is a sectional view of the first embodiment of the torsional damper device taken along the line B—B in FIG. 3a.

FIG. 4 is a schematic diagram of the continuously variable pulley transmission of the invention incorporating a torsional spring damper device or elastomer damper device.

FIG. 5a depicts the generator speed versus time where the control objective of the system is to maintain the generator speed at a frequency of 400 Hz; FIG. 5b shows the application of a step load from 50 to 1300 in-lbf applied at 0.02 second; FIG. 5c depicts the load TQO (as a torque in lbf) at the CVT pulley versus time; and FIG. 5d illustrates the higher clamping force generated through the return pressure PR necessary to prevent belt slippage during the transient step loading

DETAILED DESCRIPTION OF DISCLOSED EMBODIMENT

Figure 1:
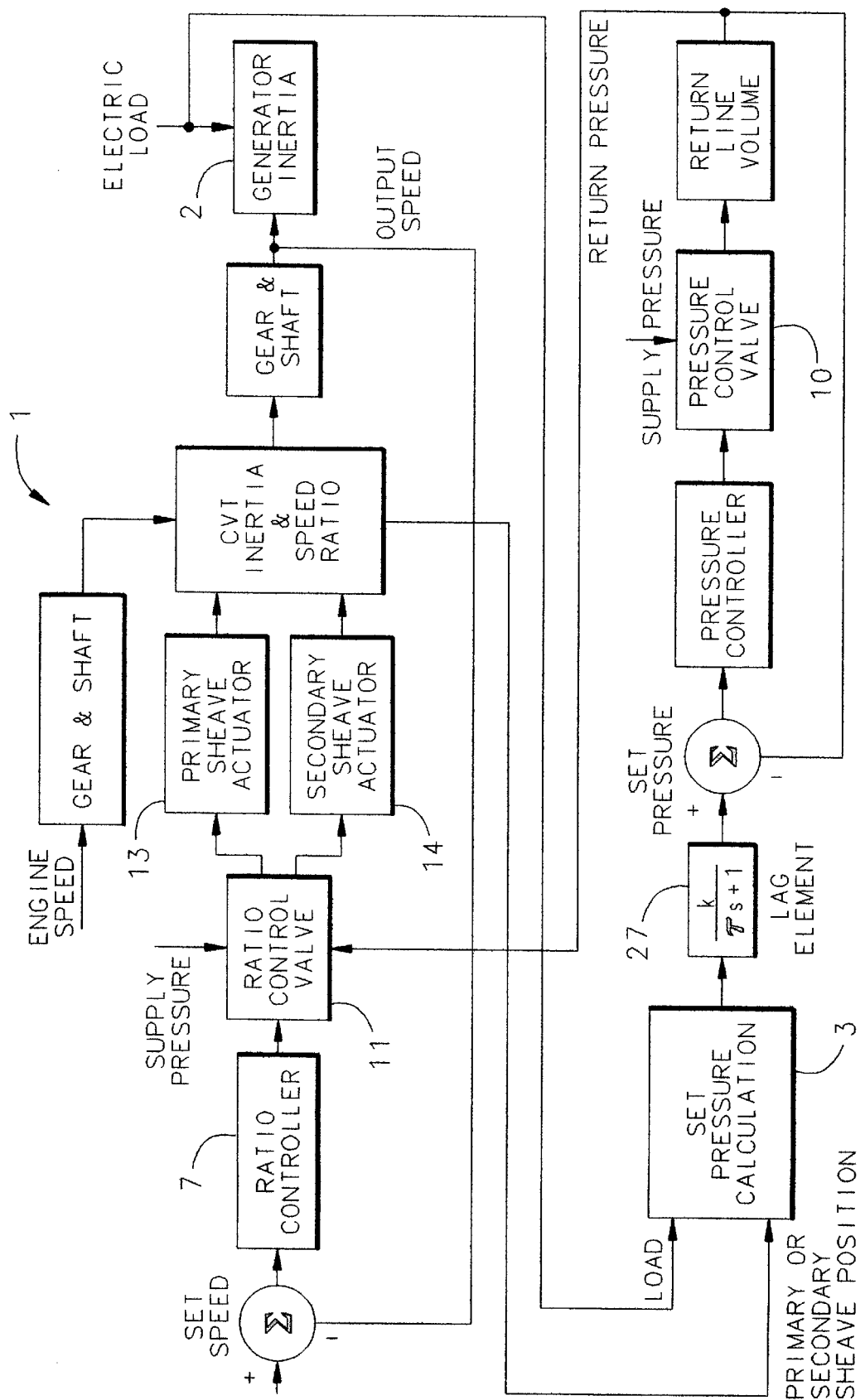
FIG. 1 is a control system block diagram of a continuously variable transmission according to a preferred embodiment of the invention.

Referring now to the drawings, FIG. 1 shows a control arrangement of the continuously variable transmission 1 of the invention used as a constant speed drive for a generator 2. The system comprises two interactive control loops: a pressure control loop 3 to provide belt clamping force for both primary and secondary sheaves 4 and 5 (FIG. 2) to prevent the belt 6 (FIG. 4) of the CVT from slipping, and a speed control loop 7 to change the CVT transmission ratio in order to maintain a constant rotational speed of the generator during engine speed and load variations.

Figure 2:
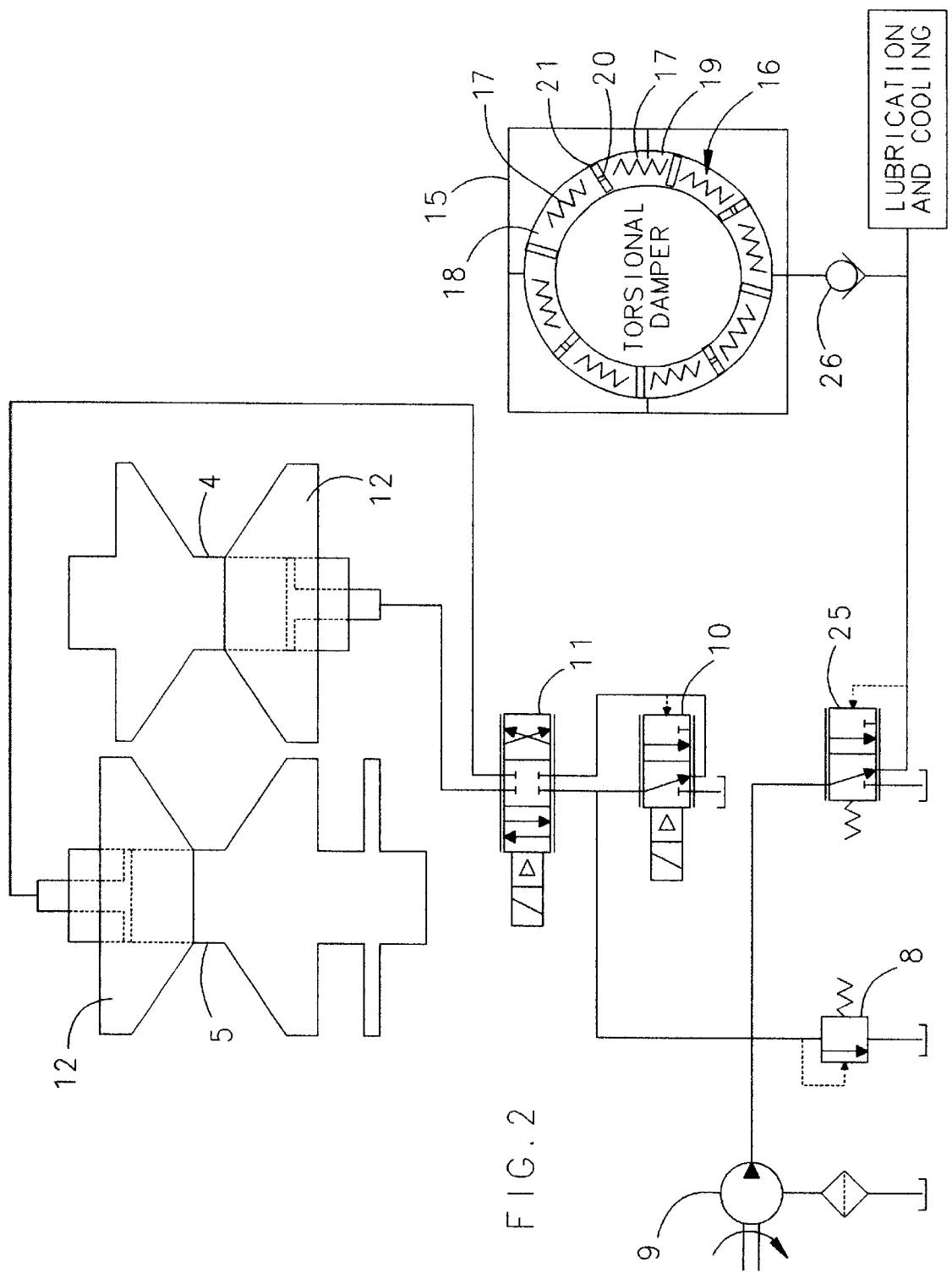
FIG. 2 is a schematic illustration of the continuously variable transmission hydraulic system with torsional damper device.

The hydraulic control system of the continuously variable transmission 1 is depicted in FIG. 2. As indicated therein, a pressure relief valve 8 maintains the output fluid pressure of the pump 9 at a constant value. This constant pressure supplies both an electrohydraulic pressure control valve 10 in the pressure control loop 3 and an electrohydraulic ratio control valve, e.g., flow control valve 11, in the speed control loop 7. The pressure control valve 10 is used to control the return pressure of the ratio control valve 11. The pressure setting is dependent on the position of the movable sheaves 12 (which is a function of the speed or transmission ratio, the primary control parameter) and the load, and the pressure is controlled to provide sufficient belt clamping force. The ratio control valve 11 supplies high pressure fluid to either the primary or secondary sheave actuator 13 and 14, respectively, depending on operating conditions. When high pressure is applied to the primary sheave actuator 13, the secondary sheave actuator is connected to the return pressure and vice versa.

Figure 3A:
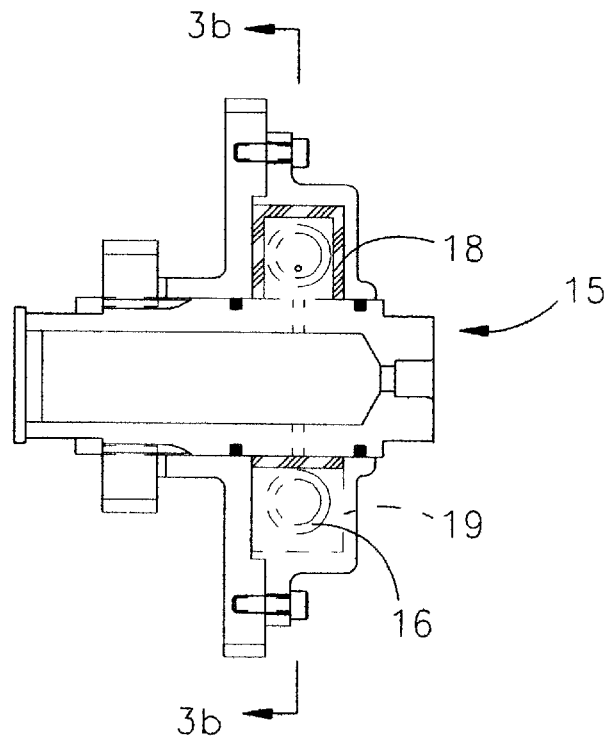
FIG. 3a is a sectional view of a first embodiment of the torsional damper device taken along the line A—A in FIG. 3b.
Figure 3B:
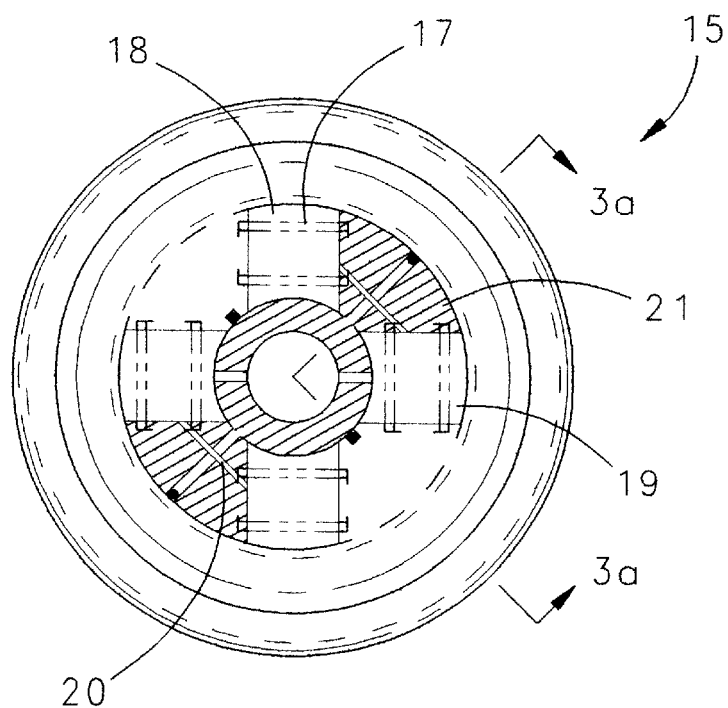
Figure 3C:
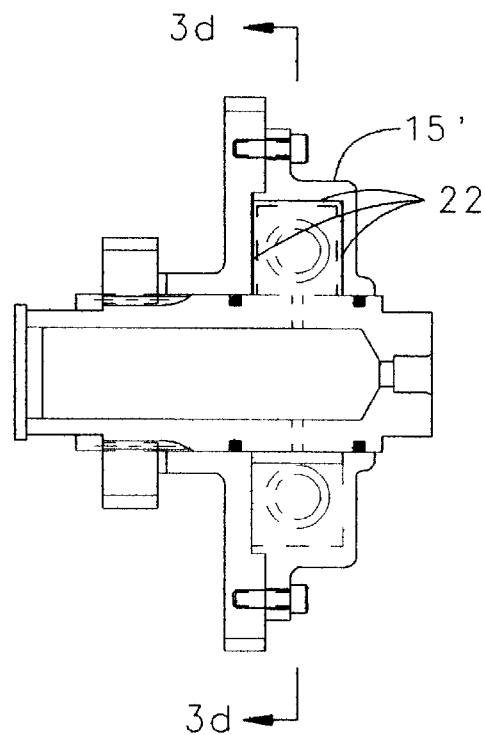
FIG. 3c is a sectional view of another form of the torsional damper device taken along the line A—A in FIG. 3d.
Figure 3D:
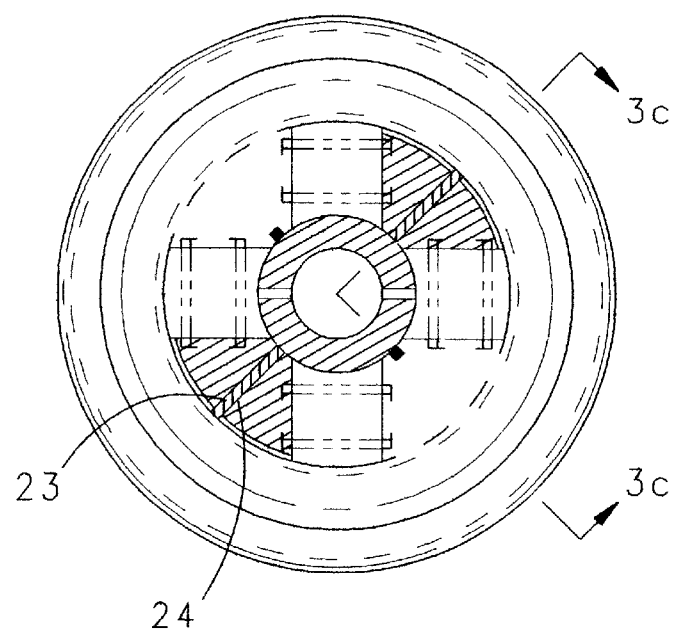
FIG. 3d is a sectional view of the torsional damper device taken along the line B—B in FIG. 3c.

If a large electrical load is suddenly applied to the generator in the continuously variable transmission disclosed in the aforementioned copending application Ser. No. 09/222,958, filed Dec. 30, 1998, for Continuously Variable Transmission with Control Arrangement and Method for Reducing Transmission Belt Slippage, the torque generated at the generator shaft is transmitted almost immediately to the sheaves of the CVT. To limit the torque transmitted, in a continuously variable transmission with control arrangement and method for preventing transmission belt slippage in copending U.S. patent application Ser. No. 09/222,948, a controllable clutch is provided between the generator and the CVT output shaft. The construction of the controllable clutch can be rather complicated and bulky. In the present invention, a torsional spring damper device or elastomer damper device, 15, in FIG. 4, is used to replace the clutch. A torsional spring 16 is formed in the device 15 by using linear coil springs 17 installed in two variable fluid chambers 18 and 19 as shown schematically in FIG. 2. A small orifice 20 in the wall 21 between the chambers connects the fluid in the two chambers and functions as a damper. This form of the torsional spring damper device 15 is illustrated in more detail in FIGS. 3a and 3b of the drawings. In another form of a torsional spring damper device, 15', shown in FIGS. 3c and 3d, a narrow gap 22 replaces the small orifice 20 of the device 15 in FIGS. 3a and 3b. However, the damper device 15 of FIGS. 3a and 3b is preferred over that in FIGS. 3c and 3d insofar as it employs an orifice instead of a gap on the ID. This allows the damper to operate over a wider temperature range since the orifice's performance is viscosity independent.

An aluminum divider 23 is placed in a slot 24 of the steel (or titanium) damper body wall. The divider expands and contracts with temperature changes, thus adjusting the gap 22 for changes in the oil viscosity to keep the performance characteristics of the damper nearly constant. The fluid in the chambers 18 and 19 in the torsional spring damper device is supplied through a pressure reducing valve 25 and a check valve 26 shown in FIG. 2 in order to keep the fluid chambers in the torsional spring damper device completely filled in case there is any leakage from the chambers. The pressure reducing valve 25 can also be used to control the damping characteristics of the torsional damper by varying the pressure, especially in an alternate design where the aluminum divider 23 would be replaced by a divider made of steel or a material with a coefficient of expansion not favorable to gap control. The torsional spring in the damper device has a much smaller spring rate than a regular steel shaft and the damper is used to damp out the twisting motion of the torsional spring. The spring damper device or elastomer damper device introduces a time lag in the transmission of the torque between the generator and the CVT, thus giving sufficient time for the control system of the transmission to respond to a sudden load change. It is preferred that the rate of torque transmission by the damper device to the transmission should match the response of the control system of the transmission.

In the case of a sudden load increase, the spring damper device provides a time delay to let the control system increase the pressure—and clamping force on the belt—before the higher torque acts on the CVT. In the case of a sudden load decrease, the delay may need to be extended. To compensate for the difference between load increase and load decrease, a lag element 27 in FIG. 1 is introduced ahead of the pressure control loop. It slows down the response of the control enough to maintain sufficient pressure for clamping the belt until the torque drops sufficiently to avoid slipping of the belt. Preferably, the lag element 27 has a time constant τ which changes with temperature of the oil to compensate for the variation of fluid viscosity.

Figure 5A:
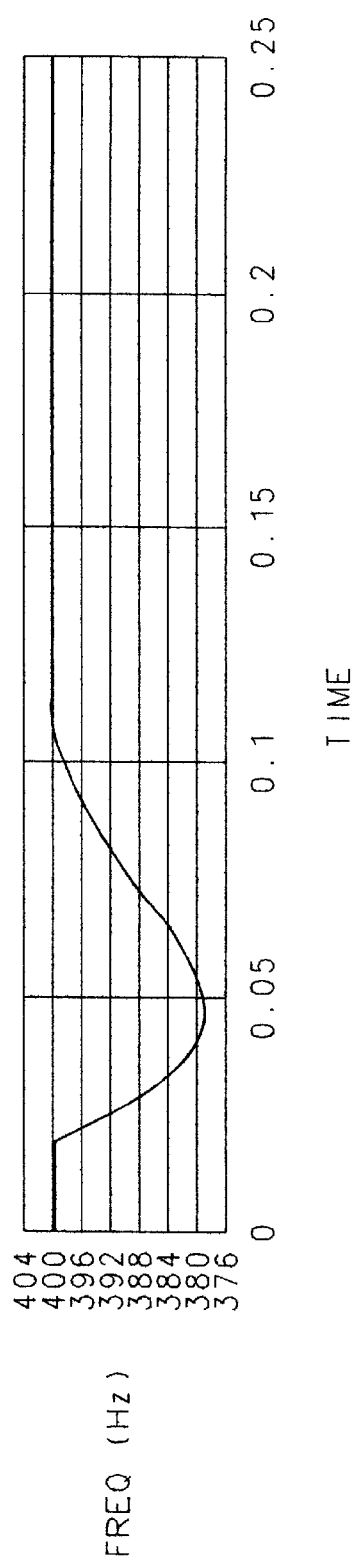
FIGS. 5a–5d are simulation plots of the system response for a load application on the continuously variable transmission of the invention where
Figure 5B:
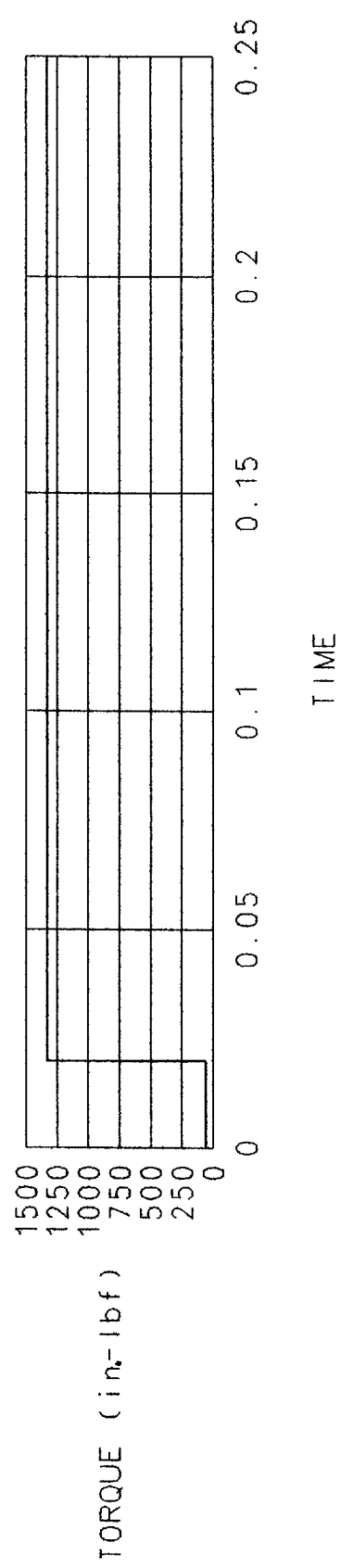
Figure 5C:
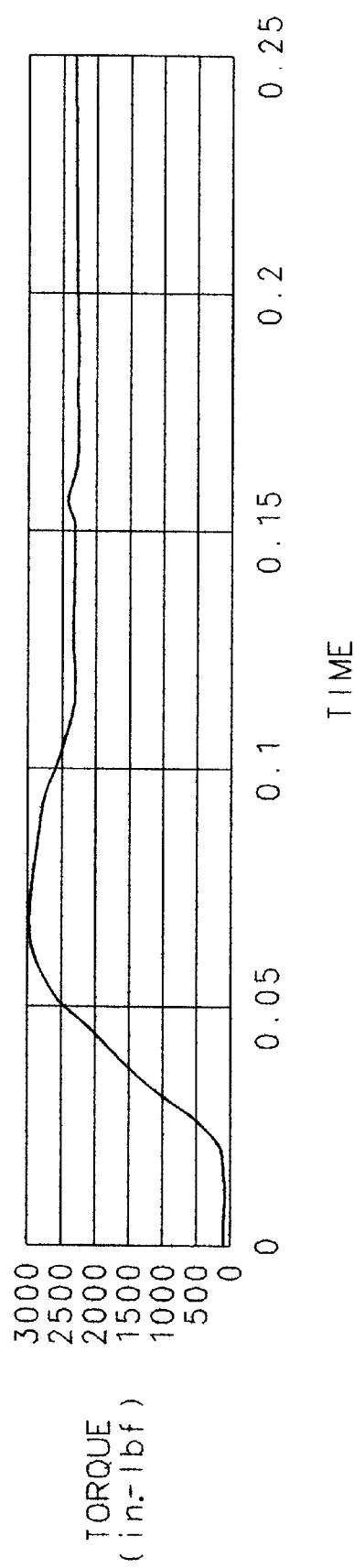
Figure 5D:
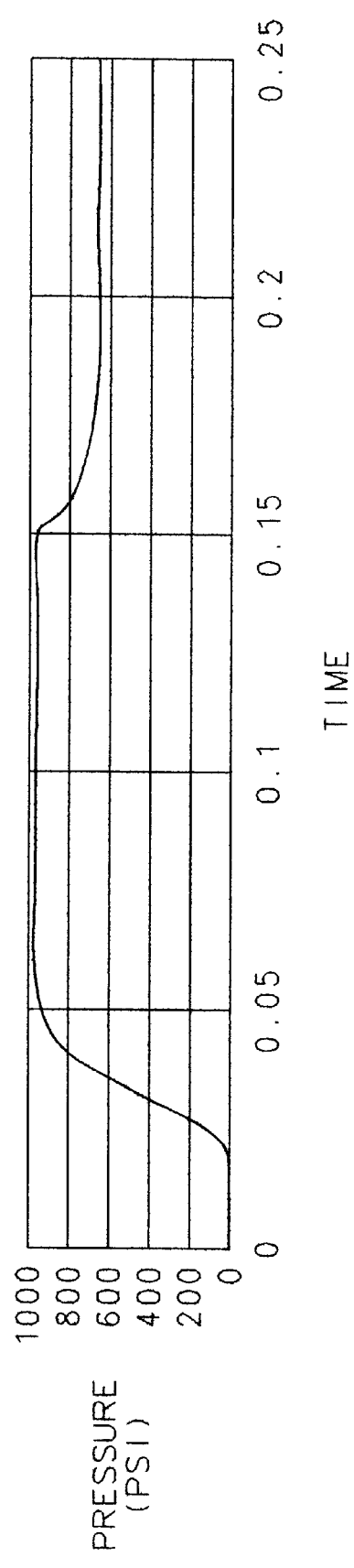
Figure 6:
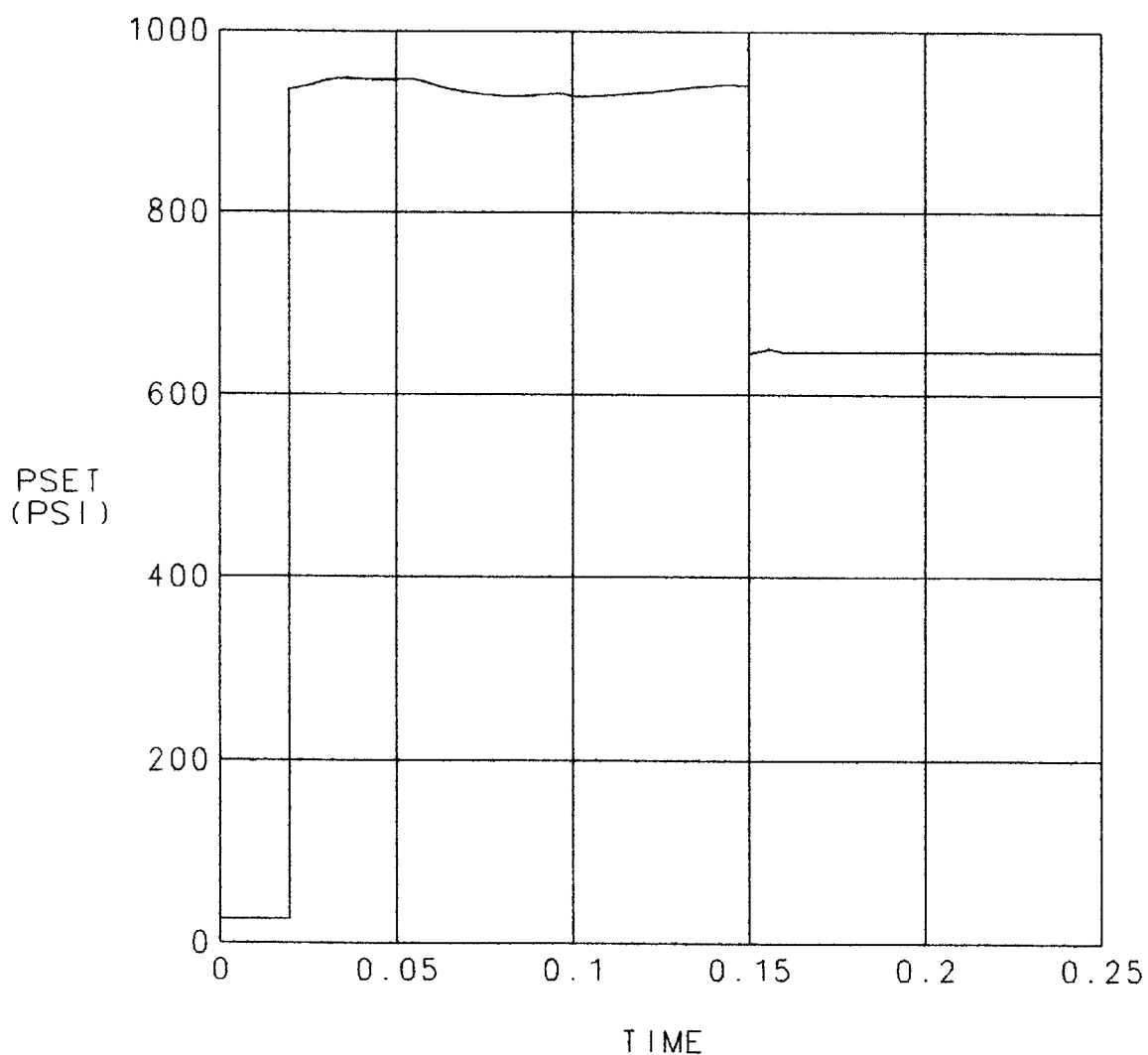
FIG. 6 is a simulation plot showing the use of a higher pressure reference signal for providing a higher clamping force during the transient of the load application as compared to that required at steady state after the transient is over.

FIGS. 5a–5d show plots of the simulated system response for a load application. The control objective of the system is to maintain the generator speed (frequency) at 400 Hz. The speed characteristic versus time is shown in FIG. 5a. At 0.02 second, a step load TQL from 50–1300 in-lbf is applied as illustrated in FIG. 5b. If there is no spring-damper device, the load TQL would almost immediately be transferred to the CVT pulley TQO. Because of the load increase, the return pressure should also increase immediately to provide sufficient belt clamping force to prevent the belt from slipping. However, in an actual system, it would take some time for the pressure to increase to the desired value. Since the pressure response is slower than the load increase, the belt would slip. By introducing the spring damper or elastomer damper device 15 according to the invention, the transmission of the load torque to the pulley is slowed down, as can be seen in the plot TQO in FIG. 5c, so that the pressure increase is slightly faster than the load increase at the pulley. Belt slippage will, therefore, not occur. However, as depicted in FIG. 5c, the torque TQO will initially overshoot its steady state value. Thus, higher clamping force will be required during the transient, and this is accomplished by using a higher pressure reference signal (higher than that required at steady state) initially and then reducing it to a lower value after the transient is over. That is, the calculated pressure $P_{set}$ to prevent slippage is preferably multiplied by a larger safety factor, 1.6, for example, during the transient, as compared with the use of a lower safety factor of 1.2, for example, used during steady state. This is graphically illustrated in FIG. 6.

While only a preferred embodiment of the invention has been disclosed herein, it is apparent that various modifications and alterations of the invention may be made. It is, therefore, the intention in the appended claims to cover all such modifications and alterations as may fall within the spirit and scope of the invention.

We claim:

1. A continuously variable transmission for transferring drive from an engine to a device to be driven, the transmission comprising
   a primary pulley for receiving drive from an engine,
   a belt,
   a secondary pulley which is coupled over the belt to the primary pulley for transferring drive to a device to be driven, the primary and secondary pulleys each having an axially movable sheave and a hydraulically operated actuator therefor to effect ratio change of the transmission and to maintain belt tension,
   a single source of constant hydraulic pressure operatively connected for driving each of the actuators, and
   a damper element selected from the group consisting of a torsional spring damper and an elastomer damper between the device to be driven and an output shaft of the secondary pulley of the continuously variable transmission for introducing a time lag in the transmission of torque between the device to be driven and the output shaft of the secondary pulley of the transmission in response to a sudden load change.

2. The transmission according to claim 1, further comprising two interactive control loops including a hydraulic pressure control loop for controlling the hydraulic pressure applied to said actuators through a ratio control valve as a function of the sensed load of said device to be driven on said transmission and the speed ratio of said transmission, and an output speed control loop for controlling the output speed of said transmission driving said device to be driven.

3. The transmission according to claim 1, further comprising two mechanically controlled loops including a hydraulic pressure control loop for controlling the hydraulic pressure applied to said actuators as a function of the sensed load of said device to be driven on said transmission and the speed ratio of said transmission, and an output speed control loop for controlling the output speed of said transmission driving said device to be driven.

4. The transmission according to claim 1, wherein said damper device is a torsional spring damper device comprising linear springs installed in two variable fluid chambers and means connecting the fluid in the two chambers which functions as a damper.

5. The transmission according to claim 4, wherein said means connecting the fluid in the two chambers comprises a small orifice through a wall separating the chambers.

6. The transmission according to claim 4, wherein said means connecting the fluid in the two chambers comprises a narrow gap on the outside diameter and both sides of a wall separating the two chambers.

7. The transmission according to claim 4, further comprising means for adjusting the size of said connecting means with temperature changes to keep the performance characteristics of said torsional spring damper device nearly constant with changes of hydraulic fluid viscosity.

8. A method for controlling a continuously variable transmission for transferring drive from an engine to a device to be driven, the transmission comprising a primary pulley for receiving drive from an engine, a belt, a secondary pulley which is coupled over the belt to the primary pulley for transferring drive to a device to be driven, the primary and secondary pulleys each having an axially movable sheave and a hydraulically operated actuator therefor to effect ratio change of the transmission and to maintain belt tension, a source of hydraulic pressure operatively connected for driving each of the actuators, a ratio control valve operatively connecting through the ratio control valve the source of hydraulic pressure to one of either the actuator or the primary pulley or the actuator of the secondary pulley depending on operating conditions to effect the ratio change of the transmission, a pressure control valve operatively connecting the source of hydraulic pressure to the other of the actuators to maintain the belt tension, a hydraulic pressure control loop for controlling the hydraulic pressure applied to the other of the actuators by way of the pressure control valve and the ratio control valve, an output speed control loop for controlling the output speed of the transmission driving the device to be driven by way of the ratio control valve, the method comprising determining the hydraulic pressure to be applied by the hydraulic pressure control loop to the actuator of the other of the actuators to keep the belt from slipping, by the steps including:

determining the load torque transmitted from the device to be driven to the secondary pulley of the transmission and the speed ratio of the transmission, calculating a valve $P_{set}$ for the set pressure of the hydraulic pressure control loop to be applied to the actuator of the other of the actuators utilizing the determining load torque;

multiplying the calculated value for the set pressure $P_{set}$ by a factor of less than 2.5 to determine the set pressure of the hydraulic pressure control loop to be applied to the actuator of the other of the actuators with some margin for safety against belt slippage while guarding against use of too large a pressure which would shorten the life of the belt and the pulleys, and wherein during the transient period of a sudden increase of the load torque or the transmission utilizing a greater factor for determining the set pressure than during the period the load torque is a steady-state value, whereby belt slippage does not occur.

9. A continuously variable transmission for transferring drive from an engine to a device to be driven, the transmission comprising:

a primary pulley for receiving drive from an engine;

a belt;

a secondary pulley which is coupled over the belt to the primary pulley for transferring drive to a device to be driven, the primary and secondary pulleys each having an axially movable sheave and a hydraulically operated actuator therefor to effect ratio change of the transmission and to maintain belt tension;

a source of hydraulic pressure comprising a hydraulic pump and a pressure relief valve in communication with the output of the hydraulic pump to maintain a constant, predetermined hydraulic output pressure of the pump, the source operatively connected for driving each of the actuators;

a ratio control valve operatively connecting the source of hydraulic pressure to one of either the actuator of the primary pulley or the actuator of the secondary pulley depending on operating conditions to effect the ratio change of the transmission while the ratio control valve operatively connects the other of the actuators of the primary and secondary pulleys to a return;

a pressure control valve operatively connecting the source of hydraulic pressure to the ratio control valve for controlling the return pressure of the ratio control valve to maintain the belt tension;

a hydraulic pressure control loop for controlling the hydraulic pressure applied to the other of the actuators as a function of the sensed load of the device to be driven on the transmission and at least one of the transmission or speed ratio, the pulley pitch radius, and the axial location of the secondary pulley, wherein a lag element is provided ahead of the hydraulic pressure control loop for compensating for a difference between a time delay needed for avoiding belt slippage during sudden load decrease as opposed to sudden load increase; and an output speed control loop for maintaining the output speed of the transmission constant.

10. The transmission according to claim 9, wherein said lag element has a time constant which changes with temperature of the hydraulic fluid of said hydraulic pressure control loop to compensate for variation of hydraulic fluid viscosity.

11. The transmission according to claim 9, further comprising a torsional spring damper between the device to be driven and an output shaft of the secondary pulley of the continuously variable transmission for introducing a time lag in the transmission of torque between the device to be driven and the output shaft of the secondary pulley of the transmission in response to a sudden load change.

12. The transmission according to claim 11, wherein said torsional spring damper device comprises linear springs installed in two variable fluid chambers and means connecting the fluid in the two chambers which functions as a damper.

13. The transmission according to claim 12, wherein said means connecting the fluid in the two chambers comprises a small orifice through a wall separating the chambers.

14. The transmission according to claim 12, wherein said means connecting the fluid in the two chambers comprises a narrow gap on the outside diameter and both sides of a wall separating the two chambers.

15. The transmission according to claim 12, further comprising means for adjusting the size of said connecting means with temperature changes to keep the performance characteristics of said torsional spring damper device nearly constant with changes of hydraulic fluid viscosity.

16. The transmission according to claim 9, further comprising an elastomer damper between the device to be driven and an output shaft of the secondary pulley of the continuously variable transmission for introducing a time lag in the transmission of torque between the device to be driven and the output shaft of the secondary pulley of the transmission in response to a sudden load change.

17. A continuously variable transmission for transferring drive from an engine to a device to be driven at a constant speed, said transmission comprising a primary pulley for receiving drive from an engine, a belt, a secondary pulley which is coupled over said belt to the primary pulley for transferring drive to a device to be driven, said primary and secondary pulley each having an axially movable sheave and a hydraulically operated actuator therefor to effect ratio change of the transmission and to maintain belt tension, a source of hydraulic pressure operatively connected for driving each of said actuators, a ratio control valve operatively connecting said source of hydraulic pressure through the ratio control valve to one of either of said actuator of said primary pulley or said actuator of said secondary pulley depending on operating conditions to effect said ratio change of the transmission, a pressure control valve operatively connecting through the ratio control valve said source of hydraulic pressure to the other of said actuators to maintain said belt tension, a hydraulic pressure control loop for controlling the hydraulic pressure applied to said other of said actuators by way of said pressure control valve and ratio control valve, an output speed control loop for controlling the output speed of said transmission driving said device to be driven by way of said ratio control valve, and wherein said hydraulic pressure control loop includes a lag element for compensating for a difference between the rate of torque transmission between said device to be driven and said transmission, and a response rate of said hydraulic pressure control loop to sudden changes in load of said device to be driven on said transmission.

18. The transmission according to claim 17, wherein said lag element has a time constant which changes with temperatures of the hydraulic fluid of said hydraulic pressure control loop to compensate for variation of hydraulic fluid viscosity.

19. The method according to claim 8, wherein said device to be driven is an electric generator and said step of determining the load torque transmitted from the device to be driven to the secondary pulley includes measuring the speed of the generator and the generator load current and calculating the torque transmitted from the generator to the secondary pulley.

20. The method according to claim 8, wherein said step of determining the load torque includes providing a torque sensor on an output shaft of the secondary pulley for sensing the torque transmitted from the device to be driven to the secondary pulley.

* * * * *